US010711942B2

(12) United States Patent
Dang

(10) Patent No.: US 10,711,942 B2
(45) Date of Patent: Jul. 14, 2020

(54) L-CHANNEL LOCK FASTENERS AND FASTENING SYSTEM

(71) Applicant: Lockdowel, Inc., Fremont, CA (US)

(72) Inventor: Hoang Dang, San Jose, CA (US)

(73) Assignee: Lockdowel, Inc., Fremont, CA (US)

( * ) Notice: Subject to any disclaimer, the term of this patent is extended or adjusted under 35 U.S.C. 154(b) by 77 days.

(21) Appl. No.: 15/817,094

(22) Filed: Nov. 17, 2017

(65) Prior Publication Data

US 2018/0135799 A1 May 17, 2018

Related U.S. Application Data

(60) Provisional application No. 62/423,736, filed on Nov. 17, 2016.

(51) Int. Cl.
| | | |
|---|---|---|
| *F16M 13/02* | (2006.01) | |
| *F16B 17/00* | (2006.01) | |
| *F16B 12/10* | (2006.01) | |
| *F16B 12/20* | (2006.01) | |
| *F16B 12/44* | (2006.01) | |
| *F16B 12/22* | (2006.01) | |
| *F16B 21/09* | (2006.01) | |
| *F16B 5/00* | (2006.01) | |
| *F16B 5/06* | (2006.01) | |

(52) U.S. Cl.
CPC ........... *F16M 13/025* (2013.01); *F16B 12/22* (2013.01); *F16B 17/00* (2013.01); *F16B 21/09* (2013.01); *F16B 5/0036* (2013.01); *F16B 5/0614* (2013.01)

(58) Field of Classification Search
CPC ....... F16M 13/025; F16B 17/00; F16B 12/22; F16B 21/09; F16B 5/0036; F16B 5/0614
See application file for complete search history.

(56) References Cited

U.S. PATENT DOCUMENTS

| | | | | |
|---|---|---|---|---|
| 325,696 | A | | 9/1885 | Post |
| 939,005 | A | * | 11/1909 | Goedeke |
| 1,380,518 | A | * | 6/1921 | Bellig ..................... F16B 12/46 403/219 |
| 3,400,847 | A | | 9/1968 | Stute |
| 4,505,402 | A | * | 3/1985 | Gerhard .................. B65D 7/14 217/65 |

(Continued)

OTHER PUBLICATIONS

International Search Report, dated Mar. 9, 2018, for corresponding International Application No. PCT/US2017/062417.

(Continued)

*Primary Examiner* — Tan Le
(74) *Attorney, Agent, or Firm* — Intellectual Property Law Group LLP

(57) ABSTRACT

A fastening device, a fastening system comprising a fastening device and corresponding slots/routs are described. There is a fastening device having at least two sides. In another embodiment the fastening device has three sides. Two of the three sides are about ninety degrees to each other and each of the two sides have a fastener located on its outer surface. There is one corresponding slot for each fastener. Each corresponding slot is on the surface of two separate substrates and located approximately ten millimeters away from an outermost edge of the substrate. The fastener secures with the corresponding slot, consequently joining the two substrates at approximately ninety degrees.

18 Claims, 9 Drawing Sheets

(56) References Cited

U.S. PATENT DOCUMENTS

| | | | |
|---|---|---|---|
| 4,727,815 A | 3/1988 | Miller | |
| 6,079,984 A * | 6/2000 | Torres | A63B 67/00 |
| | | | 273/440 |
| 6,475,055 B1 | 11/2002 | Javer et al. | |
| 8,151,535 B1 * | 4/2012 | Thompson | E04B 1/2608 |
| | | | 52/712 |
| 2009/0000235 A1 * | 1/2009 | Kieran | E04B 1/24 |
| | | | 52/656.9 |
| 2012/0321378 A1 | 12/2012 | Velez et al. | |

OTHER PUBLICATIONS

Written Opinion of the International Searching Authority, dated Mar. 9, 2018, for corresponding International Application No. PCT/US2017/062417.

* cited by examiner

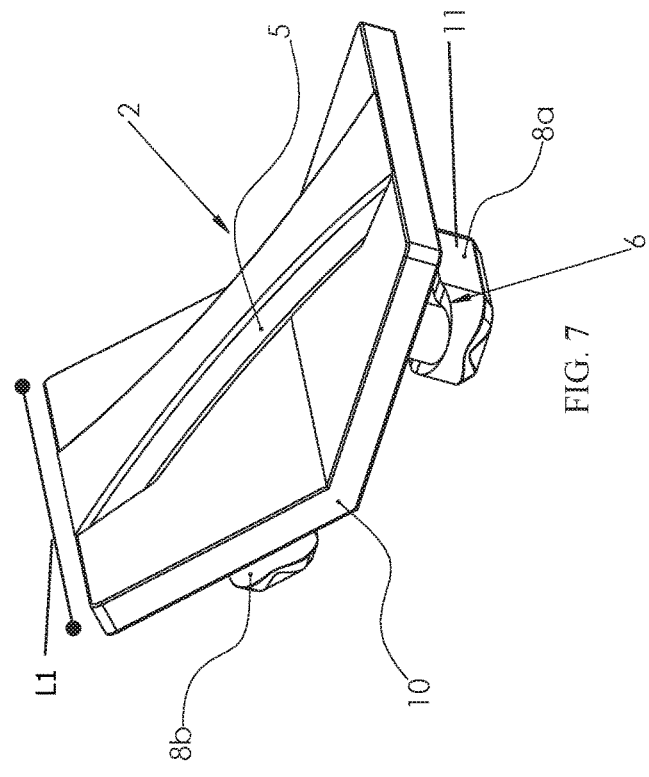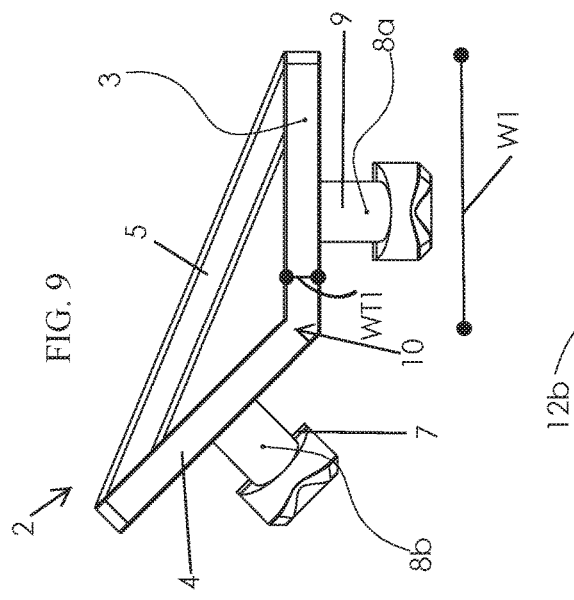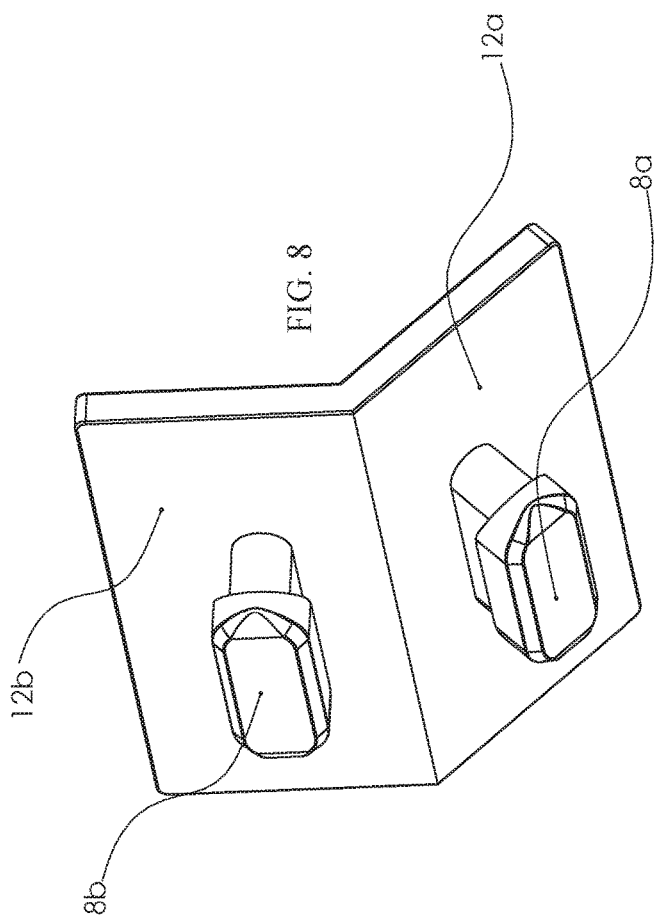

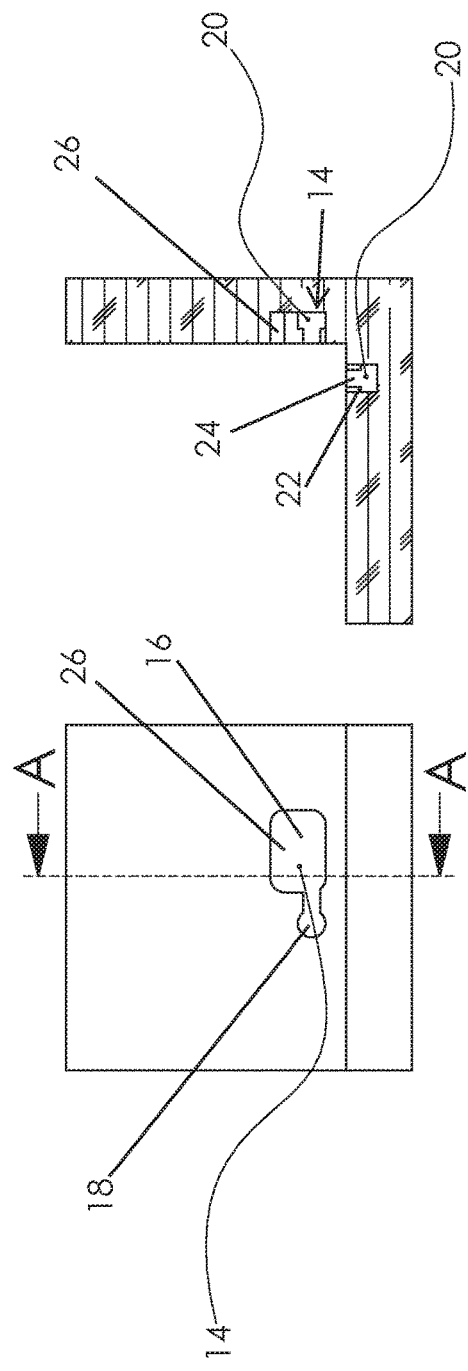
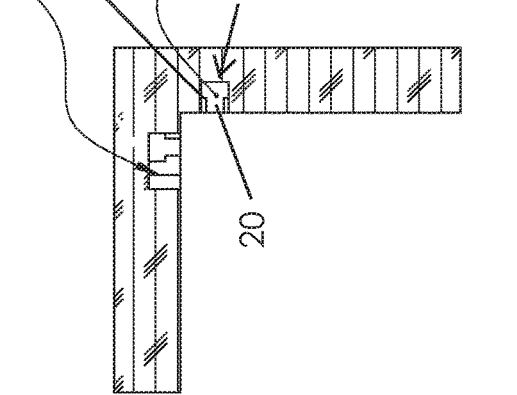
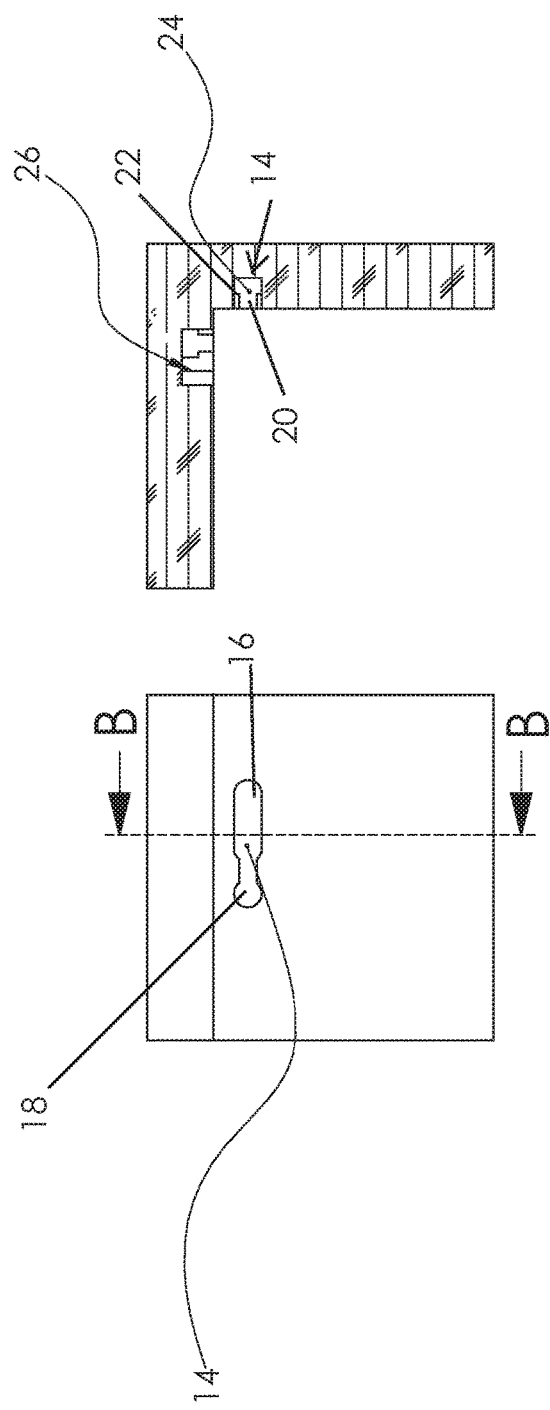

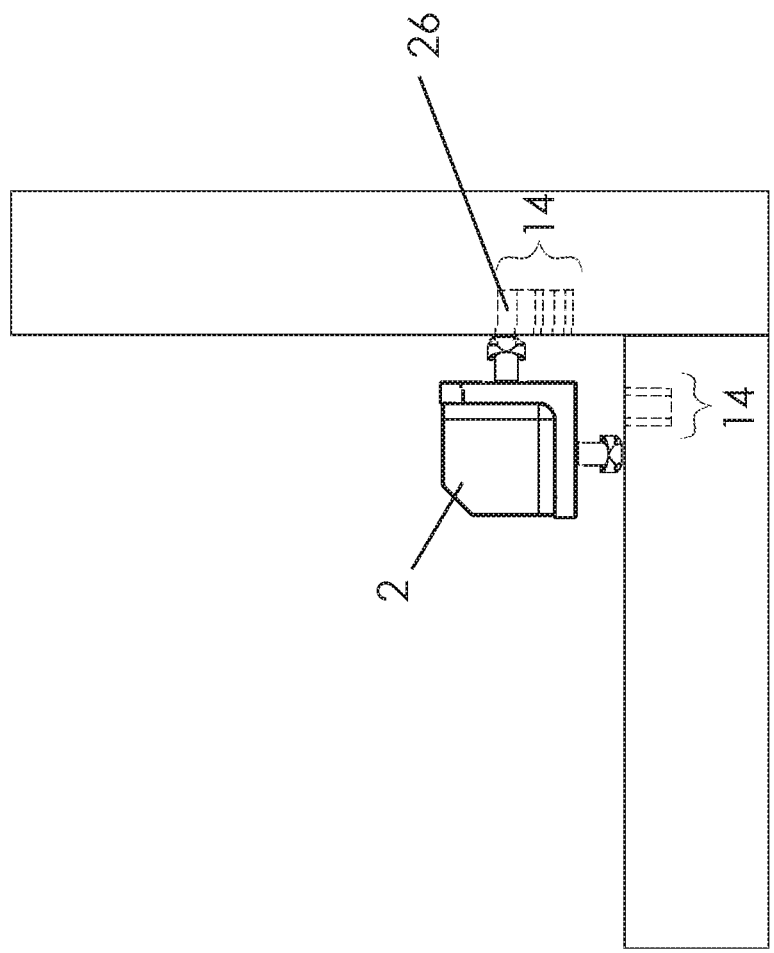

L-CHANNEL LOCK FASTENERS AND FASTENING SYSTEM

CROSS-REFERENCE TO RELATED APPLICATION

This application claims the benefit of U.S. Provisional Application No. 62/423,736, filed Nov. 17, 2016, which is hereby incorporated by reference in its entirety.

BACKGROUND OF THE INVENTION

1. Field of the Invention

This invention relates to fasteners; more particularly, to fasteners and a fastening system connecting two substrates together from about a 15 degree to 165 degree angle.

2. Background

For wood substrates that are about a half inch or ⅝ inch thick, routing and drilling on the edge risk damaging the substrates. The holes created can be misaligned preventing the substrates to be flush against each other when installed. The angles can be crooked and the joints might not fit together. Additionally, the routing and drilling can create cracks and destroy the wood substrates. As such, manufacturing time is high.

Prior solutions have been to use screws or staples along with angle brackets to attach two substrates. However, this can be cumbersome because multiple tools are involved to align and install the hardware. Further, the angle bracket needs to be properly aligned with the substrates, and for a novice assembler, this can be extremely difficult. After aligning the substrates along with the angle bracket, the user will then have to properly screw or staple the angle bracket into the substrate. Another prior solution is to drill holes on the edge of the substrate. However, this runs the risk of damaging the wood substrates. Prior solutions also do not allow for flat-packing the substrate or panels during shipment.

Accordingly, there is a need for a quick and easy tool-less fastener that connects substrates together at different angles and different surfaces. There is a further need to have multiple size fasteners to fit different size routs. There is also a need to easily transport substrates or panels by flat-pack and to reduce manufacturing time.

SUMMARY

According to an embodiment of the present invention, the fastening device having two channel locks located approximately 15 degrees to 165 degrees from each other, according to an embodiment of the present invention.

According to an embodiment of the present invention, there is a fastening device comprising: at least two sides, wherein a first side and a second side are connected at an angle of at least fifteen degrees; and a first fastener connected to an outer surface of the first side and a second fastener connected to an outer surface of the second side. Each fastener comprises a body with a first side surface opposing a parallel second side surface; and a recessed channel formed longitudinally into the first side surface and into the second side surface so as to form a step that extends from each of the first side surface and the second side surface.

According to an embodiment of the present invention, the fastening device can be shortened, lengthened, widened or narrowed.

According to an embodiment of the present invention, the channel locks on the fastening device can be located at various degrees from each other, according to an embodiment of the present invention.

According to another embodiment, there is a fastening system comprising a fastening device according to embodiments of the present invention and further comprising at least two routs, each rout formed into a surface of a separate substrate. Each rout begins from at least 10 millimeters from an outermost edge of its respective substrate, and each rout configured to initially receive an end of a fastener.

According to an embodiment of the present invention, the rout can be made on different surfaces of the substrate.

According to an embodiment of the present invention, the rout size can be widened, narrowed, lengthened or shortened.

These features, advantages and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

FIG. 7 illustrates a top perspective view of yet another embodiment of the L-channel lock, according to an embodiment.

FIG. 8 illustrates a bottom perspective view of yet another embodiment of the L-channel lock, according to an embodiment.

FIG. 9 illustrates a front elevation view of yet another embodiment of the L-channel lock, according to an embodiment.

FIG. 16 illustrates a top view of the t-slot rout, according to an embodiment.

FIG. 17 illustrates a cross sectional view of a t-slot rout along Section A-A of FIG. 16, according to an embodiment.

FIG. 18 illustrates a top view of another embodiment of the t-slot rout, according to an embodiment.

FIG. 19 illustrates a cross sectional view of another embodiment of the t-slot rout along Section B-B of FIG. 18, according to an embodiment.

FIG. 20 illustrates yet another embodiment of an L-channel lock being inserted into t-slot routs, according to an embodiment.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

The L-channel lock can also be referred to as a fastening device. The channel lock can also be referred to as a fastener. In most embodiments of the L-channel lock, there is a first side 3, second side 4, and third side 5. The combination of the three sides form a triangular shape in cross section, essentially the sum of the three interior angles formed from the connection of the three sides is 180 degrees, according to an embodiment. The first side 3 and the second side 4, each has an outer surface facing a respective substrate when the L-channel lock is engaged in a t-slot rout 14 on the respective substrate. The thickness T1 of the first side 3, second side 4, and third side 5 is T1. In some embodiments, there is no third side 5.

Figure 1:
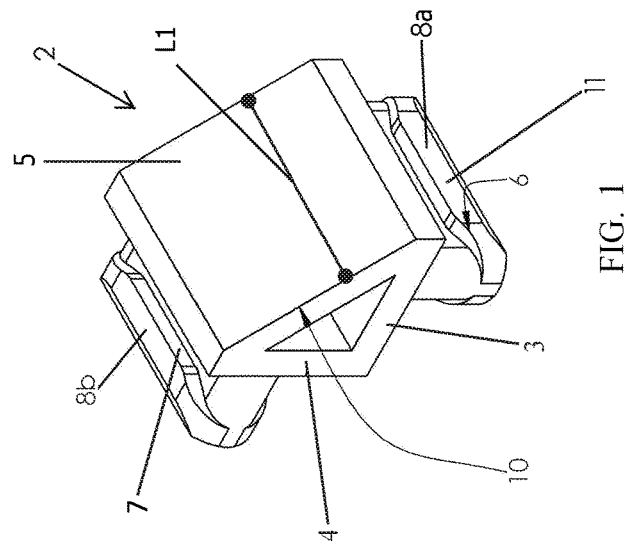
FIG. 1 illustrates a top perspective view of the L-channel lock, according to an embodiment.
Figure 4:
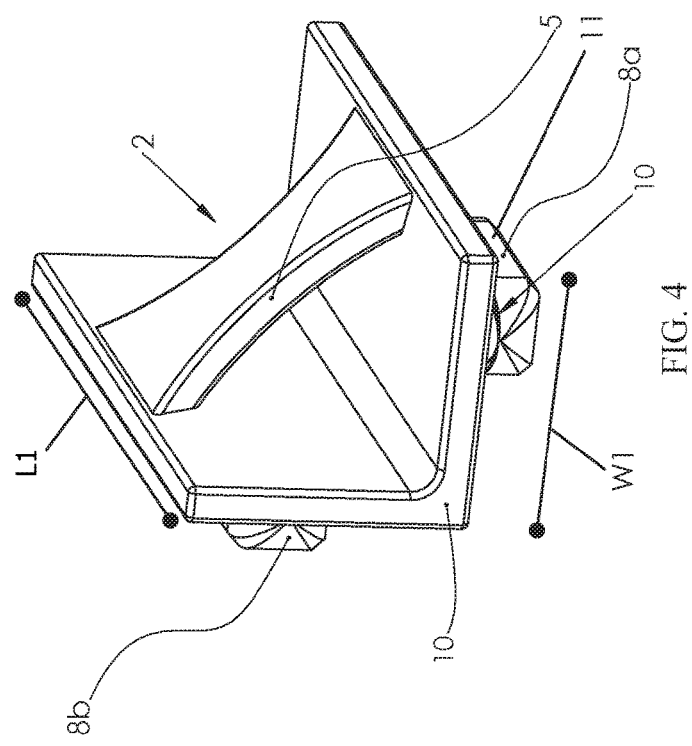
FIG. 4 illustrates a top perspective view of another embodiment of the L-channel lock, according to an embodiment.

Referring now to FIGS. 1, 4 and 7, the figures illustrate a top perspective view of the L-channel lock fastening device 2, according to an embodiment, comprising an L-bracket 10, a first channel lock 8a and a second channel lock 8b. The triangular shape of the L-bracket 10 allows for anti-flexing of the joint when the L-channel lock 2 is inserted into a t-slot rout 14. Both channel locks 8a and 8b comprise a ramp 6 that helps guide the channel lock 8a and 8b into the t-slot rout 14 via the key step 11. The first channel lock 8a and second channel lock 8b, may be referred to as a first fastener and second fastener respectively. The L-channel lock 2 is comprised of all nylon, such as nylon 6-6. However, other polymeric materials can be contemplated. Metal materials can also be contemplated, such as die-cast aluminum.

The body of the first channel lock 8a and second channel lock 8b is each connected to and protrudes from its respective outer surface of the first side 3 and second side 4. I.e. first channel lock 8a protrudes from the outer surface of the first side 3 and the second channel lock 8b protrudes from the outer surface of the second side 4. Each body comprises a center support 9 having a recessed channel that forms longitudinally along the length L1 of opposing sides of the center support 9. The width of the recessed channel on each side of the center support 9 is bounded by the respective outer surface of the side that the channel lock protrudes from and an interference edge 7 or ledge which extends from each side of the center support 9. I.e. the outer surface and the edge 7 serve as the walls of the channel. This edge 7 may also be referred to as a step or a lip. The opposing parallel sides of the center support 9 of each channel lock where each longitudinally formed recessed channel is located may be referred to as a first side surface and parallel second side surface of the body.

Figure 10:
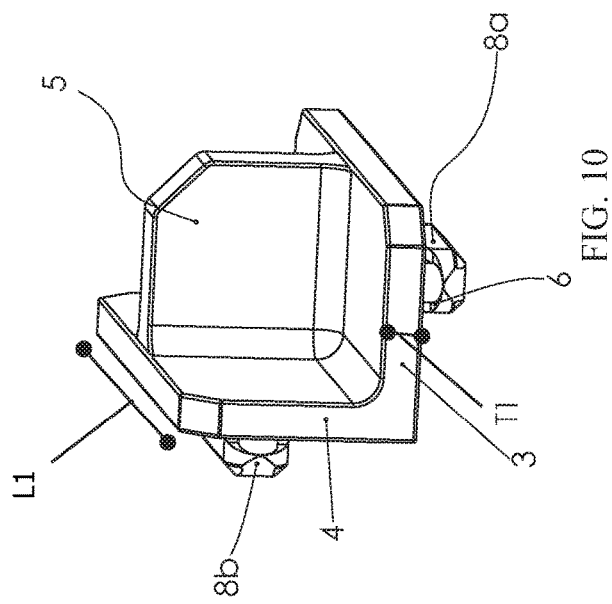
FIG. 10 illustrates a top perspective view of a further embodiment of the L-channel lock, according to an embodiment.

In one embodiment, as shown in FIGS. 1, 4, and 10, the L-channel lock 2 is configured to have two channel locks 8a, 8b at approximately ninety-degrees from each other. Whereas for another embodiment, as shown in FIG. 7, the L-channel lock 2 is configured to have two channel locks 8a, 8b at approximately 135 degrees from each other.

The dimensions of the L-channel lock 2 are variable. The length L1 of the L-channel lock 2 can be increased or decreased to fit a shorter or longer t-slot rout 14. For example, the width W1 can be 5-18 millimeters and the length L1 can be 8-49 millimeters. As shown in FIG. 1, the third side 5 can be a full piece or material can be removed leaving the third side 5 smaller, as shown in FIGS. 4, 7 and 10. The L-channel lock 2 can function with only the first side 3 and second side 4 if the thickness T1 is increased. The third side 5 provides sheer strength support because the thickness T1 is only about 3 millimeters as shown in FIGS. 1, 4, 7 and 10, which will cause the L-channel lock 2 to bend with only first side 3 and second side 4.

Referring now to FIGS. 2, 5, 8, 11 the figures illustrate a bottom perspective view of the L-channel lock 2, according to an embodiment comprising channel lock 8a and 8b, a bottom surface 12a and 12b. The channel lock 8a and 8b are permanently attached to the bottom surface 12a and 12b of the L-channel lock 2. The channel lock 12a and 12b are shown to be approximately ninety degrees from each other; however, other angles can be contemplated. For example, FIG. 8 illustrates the channel lock 12a and 12b to be approximately 135 degrees from one another. The bottom surface 12a and 12b is substantially flush with the surface of the substrate when the L-channel lock 2 is inserted into the t-slot rout 14 (not shown, see FIG. 15).

Figure 3:
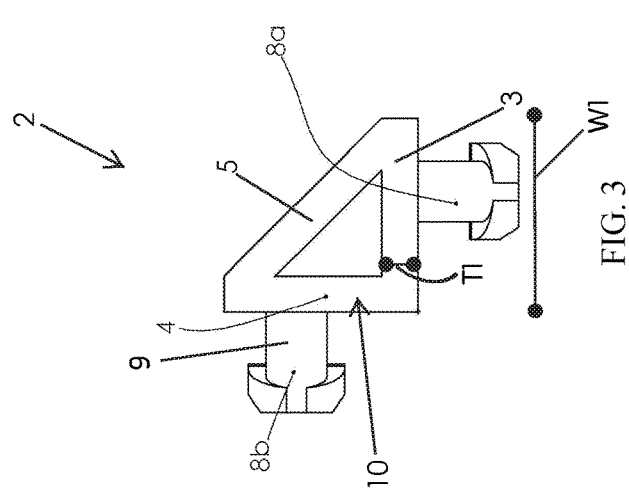
FIG. 3 illustrates a front elevation view of the L-channel lock, according to an embodiment.
Figure 2:
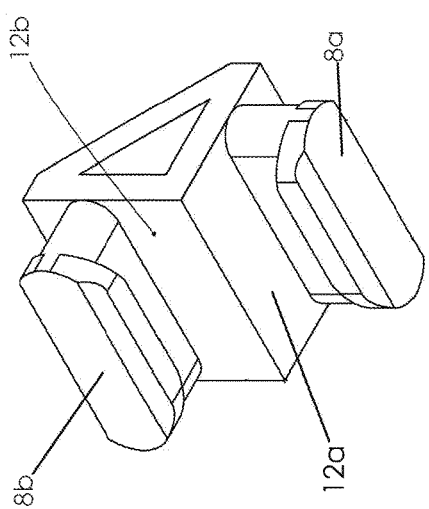
FIG. 2 illustrates a bottom perspective view of the L-channel lock, according to an embodiment.
Figure 6:
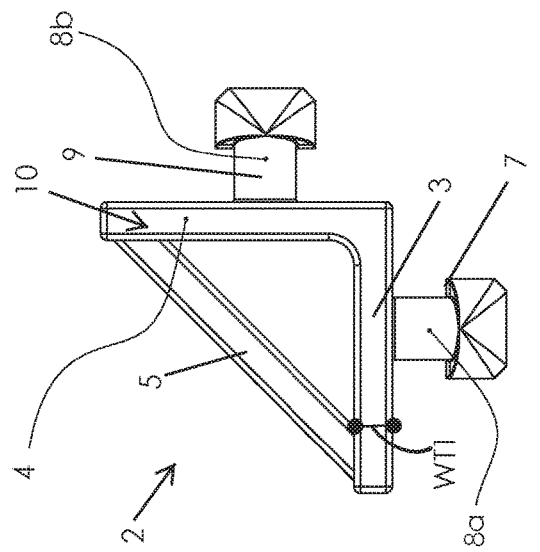
FIG. 6 illustrates a front elevation view of another embodiment of the L-channel lock, according to an embodiment.
Figure 5:
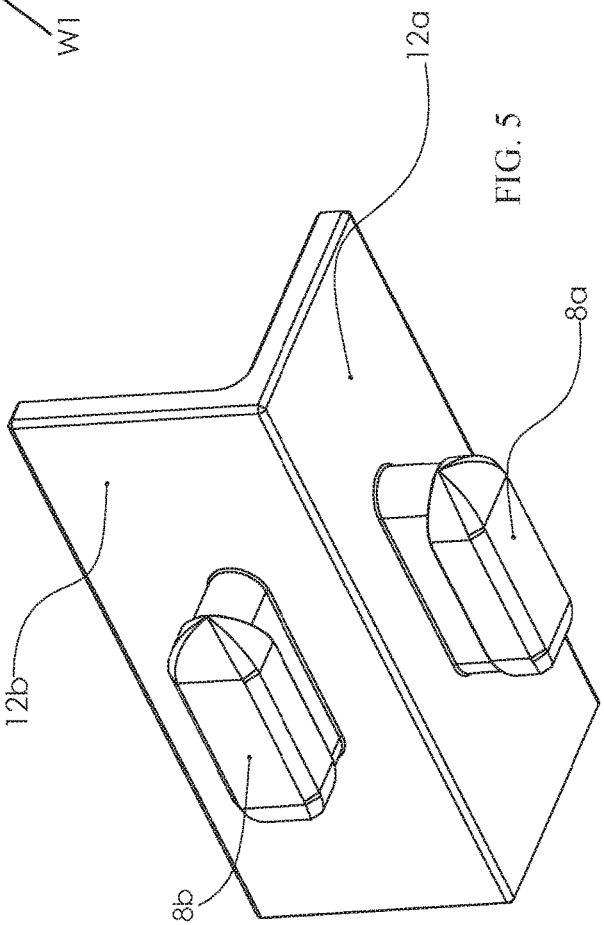
FIG. 5 illustrates a bottom perspective view of another embodiment of the L-channel lock, according to an embodiment.

Referring now to FIGS. 3, 6 and 9, the figures illustrate a front elevation view of the L-channel lock 2, according to an embodiment comprising a channel lock 8a and 8b and an L-bracket 10. The thickness T1 of the first side 3, second side 4, and third side 5 can be at a minimum of about 3 millimeters until the entire first side 3, second side 4, and third side 5 form a solid block. The angle of the L-bracket 10 can be changed thus changing the angle of channel lock 8a relative to channel lock 8b. The change in angle of the L-bracket 10 allows substrates to connect at different angles and at different locations on the substrates. The angle between first side 3 and second side 4 of the L-bracket 10 can range between 15 degrees to 165 degrees. Each channel lock 8a, 8b has a center support 9, which can also be referred to as a channel.

Figure 12:
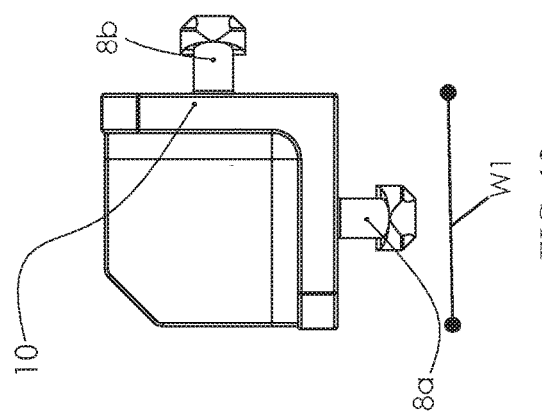
FIG. 12 illustrates a front elevation view of a further embodiment of the L-channel lock, according to an embodiment.
Figure 11:
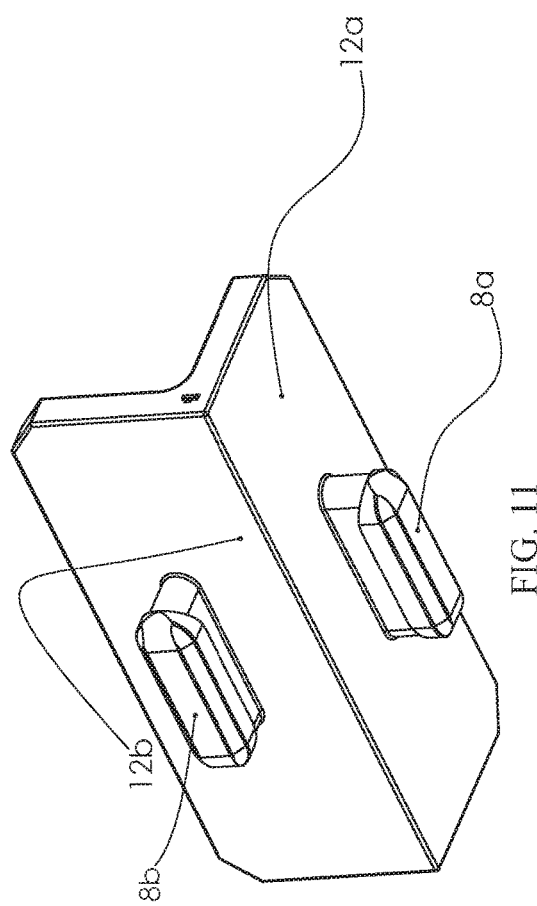
FIG. 11 illustrates a bottom perspective view of a further embodiment of the L-channel lock, according to an embodiment.

FIG. 10 illustrates a top perspective view of a further embodiment of the L-channel lock 2, according to an embodiment. As shown in FIG. 10, L1 is approximately 49 millimeters in length. L1 can be shortened to about 22 millimeters and can be increased to a necessary length. In the embodiment shown, 49 millimeters is disclosed because it is used with the t-slot routs 14 and is economical. T1 is about 3 millimeters, which makes the L-channel lock 2 structurally sound and it can be increased until it becomes a square block. FIG. 11 illustrates a bottom perspective view of a further embodiment of the L-channel lock 2, according to an embodiment. FIG. 12 illustrates a front elevation view of a further embodiment of the L-channel lock 2, according to an embodiment. W1 is approximately 18 millimeters, which is wide enough to be used with the t-slot rout 14 and is most economical to make. W1 can be shorted to a minimum of about 13 millimeters and can be increased to a necessary width.

Figure 13:
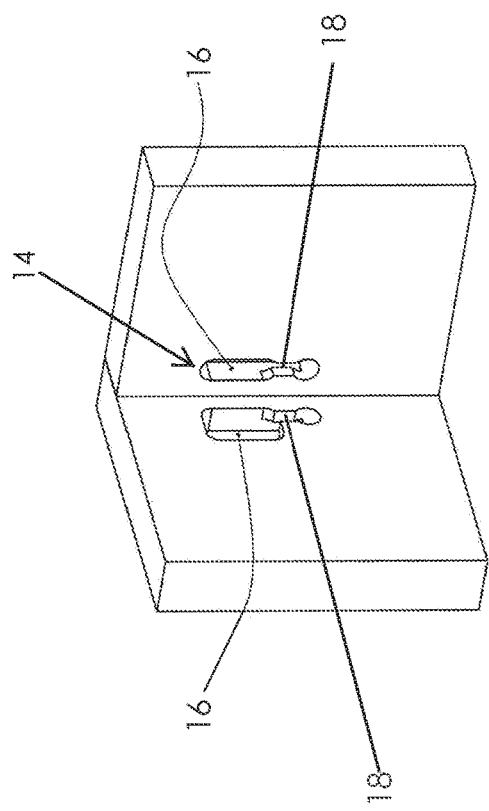
FIG. 13 illustrates two t-slot routs of the L-channel lock, according to an embodiment.

FIG. 13 illustrates two t-slot routs 14 of the L-channel lock 2, according to an embodiment having an insertion portion 16 and a locking portion 18. Each t-slot rout 14 is located on a separate substrate and the L-channel lock 2 utilizes both of the t-slot routs 14 to lock the substrates together. The substrates can be for example, particle board, plywood, solid wood, polyvinyl chloride (PVC) or starboard. The dimensions of the t-slot rout can be 5-8 millimeters in width and 20-64 millimeters in length and about 9-9.5 millimeters in depth. The t-slot rout 14 requires a router bit to rout on the surface of the substrate. The t-slot rout 14 are pre-machined on a CNC router so the t-slot rout 14 are aligned accurately. In the case of routing the t-slot rout 14 in panels, the t-slot rout 14 is created about 10 millimeters from at least one outermost edge of each substrate instead of half the panel thickness which eliminates the need for edge boring. The t-slot rout 14 can be made on different locations of the substrate so that the substrates can be connected by the L-channel lock 2 in different ways. For example, the t-slot rout 14 can be located about 20 millimeters off the edge of the board and can be placed anywhere along the length of the board. The t-slot rout 14 and the L-channel lock 2 do not require edge boring. FIG. 13 illustrates the two substrates at an angle to each other preparing to fasten with an L-channel lock.

Figure 14:
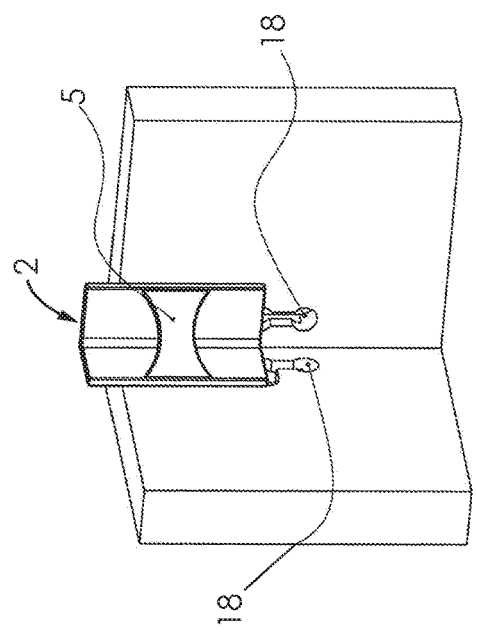
FIG. 14 illustrates the L-channel lock inserted into the t-slot routs, according to an embodiment.
Figure 15:
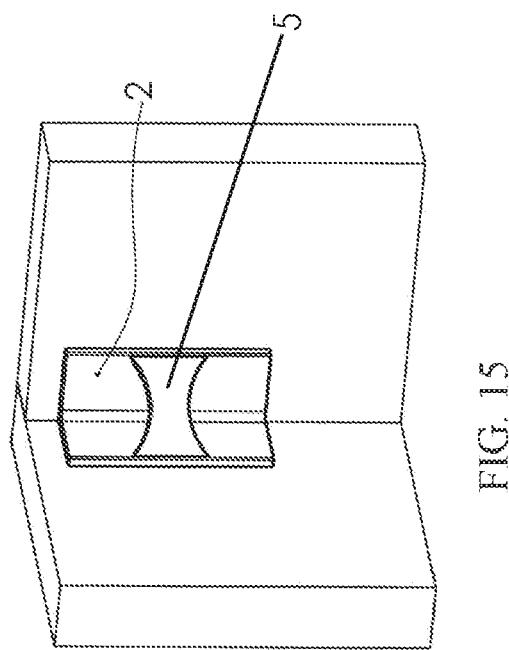
FIG. 15 illustrates the L-channel lock fastened into the t-slot routs, according to an embodiment.

Referring now to FIGS. 14 and 15, both figures illustrate an L-channel lock 2 inserted into the t-slot rout 14, according to an embodiment. The L-channel lock 2 slides two substrates together to fasten the substrates in place. The L-channel lock 2 is made for ⅝ inch and ¾ inch materials. Another embodiment of the L-channel lock 2 is made for a ½ inch material. The L-channel lock 2 eliminates the need for using two separate channel locks since the t-slot rout 14 is always at least 10 millimeters from at least one outermost edge of each substrate, thus preventing possible breakout. FIG. 8 illustrates the bottom surface 12a and 12b substantially flush against the surface of the substrate while the channel lock 8a and 8b (not shown, see FIG. 2) are inserted into the insertion portion 16 of the t-slot rout 14. A user then pushes down on the L-channel lock 2 using one's hand or gently hits it with a mallet so that it slides toward the locking portion 18 to fasten the L-channel lock 2 into place. FIG. 15 illustrates the L-channel lock 2 fully fastened in the t-slot rout 14. The L-channel lock 2 fastens the substrates together using a friction fit mechanism. The connecting substrates each have a t-slot rout 14, therefore, the user places each substrate at a desired angle to each other so that the t-slot routs 14 are align. The user then inserts the channel locks 8a and 8b into their corresponding t-slot rout 14 at the insertion portion 16 and slides the channel lock 2 until it fastens by friction fit in the locking portion 18. The L-channel lock can be used in conjunction with spring pins such as metal dowels or wood dowels when used for assembling furniture or other items. This eliminates the need for glue and clamping.

FIG. 16 illustrates a top view of the t-slot rout 14, according to an embodiment. The insertion portion 16 is wider in this embodiment because there is a cutout to insert the L-channel lock 2. Since the two panels are at a 90 degree angle, the L-channel lock 2 is inserted into the cutout 26 of the insertion portion 16 first so that the L-channel lock 2 is flat against both t-slot routs 14 before it slides to lock. FIG. 17 illustrates a cross sectional view of a t-slot rout 14 along Section A-A of FIG. 16, according to an embodiment. The cutout 26 allows insertion of the L-channel lock 2 into both t-slot routs 14 since the two panels are at about 90 degrees angle to each other. FIG. 18 illustrates a top view of another embodiment of the t-slot rout, according to an embodiment. FIG. 19 illustrates a cross sectional view of another embodiment of the t-slot rout along Section B-B of FIG. 18, according to an embodiment. Both embodiments of the t-slot rout 14 comprise an insertion potion 16 and a locking portion 18. As seen in the cross-sections illustrated in FIG. 17 and FIG. 19, both t-slot rout 14 embodiments comprise a center support slot 20, undercut 22, and undercut slot 24. The center support slot 20 snugly holds the center support 9 of the channel lock 8a, 8b. The undercut slot 24 draws the two substrates together because it makes a tight friction fit with the interference edge 7 (not shown, see FIGS. 1, 6, and 9). The undercut 66 divides the t-slot rout 14 into a center support slot 20 and undercut slot 24.

Figure 21:
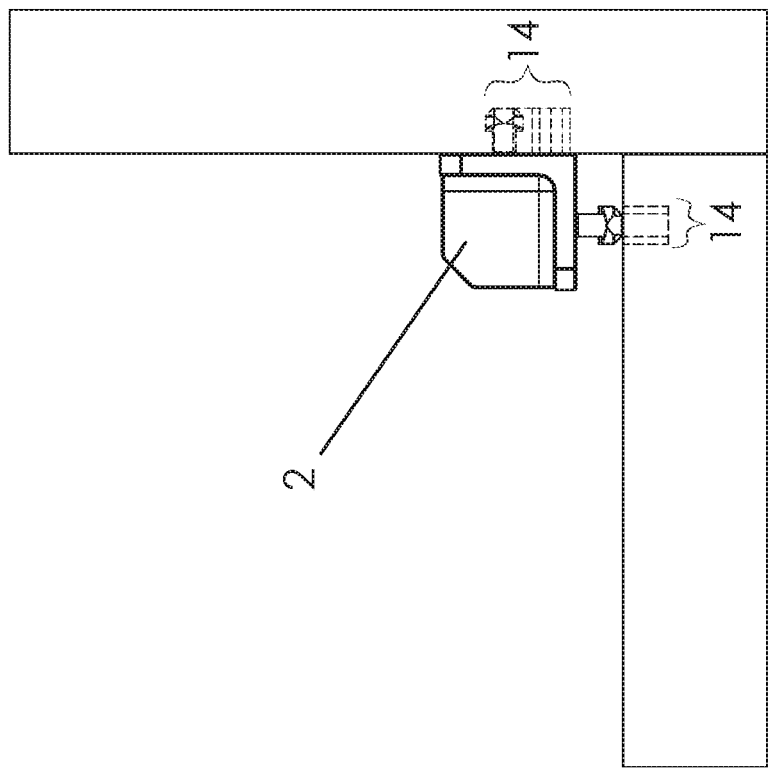
FIG. 21 illustrates the L-channel lock in FIG. 20 inserted into t-slot routs, according to an embodiment.

FIG. 20 illustrates yet another embodiment of an L-channel lock 2 being inserted into t-slot routs 14, according to an embodiment. Since the panels are at a 90 degree angle, inserting the L-channel lock 2 at an angle is not possible. As such, channel lock 8b is inserted into the cutout 26 of the t-slot rout 14 and channel lock 8a is inserted into the insertion portion 16 of the t-slot rout 14 as illustrated in FIG. 21. Once both channel locks 8a and 8b are fully inserted and are substantially flush against the bottom surface of the t-slot rout 14, the L-channel lock 2 is slid into the locking portion 18 of the t-slot rout 14.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A fastening device comprising:
   at least two sides, wherein a first side and a second side are connected at an angle of at least fifteen degrees; and
   a first fastener connected to an outer surface of the first side and a second fastener connected to an outer surface of the second side, each fastener having a body with a first side surface opposing a parallel second side surface;
   each fastener comprising a recessed channel formed longitudinally into the first side surface and into the second side surface so as to form a step that extends from each of the first side surface and the second side surface, each step having a guide ramp at a first end of the recessed channel and at a second end of the recessed channel providing an initial slope to each step.

2. The fastening device of claim 1, further comprising a third side connected between the first side and the second side.

3. The fastening device of claim 2, wherein a width of a side is about 5-18 millimeters.

4. The fastening device of claim 2, wherein a length of a side is about 8-49 millimeters.

5. The fastening device of claim 2, wherein the first side and the second side are connected at a maximum angle of about 165 degrees to each other.

6. The fastening device of claim 5, wherein the first side and the second side are connected preferably at 90 degrees to each other.

7. The fastening device of claim 5, wherein the first side and the second side are connected preferably at 135 degrees to each other.

8. The fastening device of claim 2, wherein the fastening device is made of a nylon material.

9. The fastening device of claim 2, wherein the fastening device is made of a metal material.

10. A fastening system comprising:
a fastening device comprising at least three sides, wherein a first side and a second side are connected at an angle of at least fifteen degrees and a third side connecting the first side and the second side; and
an outer surface of the first side and an outer surface of the second side each comprising a fastener having a body with a first side surface opposing a parallel second side surface;
each fastener comprising a recessed channel formed longitudinally into the first side surface and into the second side surface so as to form a step that extends from each of the first side surface and the second side surface; and
each step having a ramp at a first end of the recessed channel and at a second end of the recessed channel providing an initial slope to each step, thereby guiding each fastener into one of at least two routs; and
each of the at least two routs, formed into a surface of a separate substrate, each rout beginning from at least 10 millimeters from an outermost edge of its respective substrate, and each rout configured to initially receive an end of a fastener.

11. The fastening system of claim 10, wherein the first side and the second side are connected at an angle of about 15 to 165 degrees to each other.

12. The fastening system of claim 10, wherein the first side and the second side are connected at an angle of about 90 degrees to each other.

13. The fastening device of claim 10, wherein the first side and the second side are connected preferably at an angle of 135 degrees to each other.

14. The fastening device of claim 10, wherein the fastening device is made of a nylon material.

15. The fastening system of claim 10, wherein the rout is t-shaped.

16. The fastening system of claim 10, wherein the rout has a width of about 5-8 millimeters.

17. The fastening system of claim 10, wherein the rout has a length of about 20-64 millimeters.

18. The fastening system of claim 10, wherein the rout has a depth of about 9-9.5 millimeters.

* * * * *